United States Patent
Larson et al.

(10) Patent No.: US 11,383,837 B2
(45) Date of Patent: Jul. 12, 2022

(54) UNDER FLOOR STORED PALLET SEQUENTIAL/INDEPENDENT LOCKING SYSTEM

(71) Applicant: GOODRICH CORPORATION, Charlotte, NC (US)

(72) Inventors: Wallace Harold Larson, Jamestown, ND (US); Nicholas Thomas Axline, Jamestown, ND (US); Alexander Mitchell Heyd, Jamestown, ND (US); Brandon David Lee, Jamestown, ND (US); Matthew James Richter, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 374 days.

(21) Appl. No.: 16/738,900

(22) Filed: Jan. 9, 2020

(65) Prior Publication Data
US 2021/0214083 A1 Jul. 15, 2021

(51) Int. Cl.
*B64D 9/00* (2006.01)

(52) U.S. Cl.
CPC .................................... *B64D 9/003* (2013.01)

(58) Field of Classification Search
CPC ................................ B64D 9/00; B64D 9/003
See application file for complete search history.

(56) References Cited

U.S. PATENT DOCUMENTS

| | | | | |
|---|---|---|---|---|
| 1,704,914 A * | 3/1929 | Hilyard | ..................... | A47D 9/02 5/109 |
| 2,493,242 A * | 1/1950 | Geer | ..................... | B66D 1/605 74/528 |
| 3,741,508 A * | 6/1973 | Alberti | .................. | B64D 9/003 410/69 |
| 3,800,713 A * | 4/1974 | Nordstrom | ............... | B60P 7/13 410/79 |
| 3,927,622 A | 12/1975 | Voigt | | |
| 4,349,302 A | 9/1982 | Ferguson, Jr. | | |
| 2003/0057326 A1* | 3/2003 | Medina | .................... | B64D 9/00 244/137.1 |
| 2007/0237598 A1* | 10/2007 | Schulze | ................... | B64C 1/20 410/80 |

(Continued)

FOREIGN PATENT DOCUMENTS

CN 202782856 U 3/2013
EP 2 783 982 A1 10/2014

*Primary Examiner* — Christopher D Hutchens
(74) *Attorney, Agent, or Firm* — Snell & Wilmer L.L.P.

(57) ABSTRACT

A cargo restraint system includes a driveshaft having a plurality of drive pins and a plurality of first restraints each configured to actuate between a lowered position and a raised position. Each of the plurality of first restraints includes a head to actuate between the lowered position and the raised position, a drive disk rotatably coupled to the head and having a notch to receive a respective drive pin of the plurality of drive pins, and a locking disk to be received by the drive disk in response to the head being in the raised position. The cargo restraint system further includes a handle coupled to the driveshaft and configured to translate the driveshaft and to actuate such that the respective drive pin is received by the notch of the respective first restraint to move the respective first restraint between the lowered position and the raised position.

20 Claims, 18 Drawing Sheets

(56) References Cited

U.S. PATENT DOCUMENTS

| | | |
|---|---|---|
| 2015/0329206 A1 | 11/2015 | Larson et al. |
| 2019/0256227 A1* | 8/2019 | Balasubramanian ........................ G06F 11/006 |
| 2019/0301899 A1* | 10/2019 | Clos ....................... B64D 9/003 |

* cited by examiner

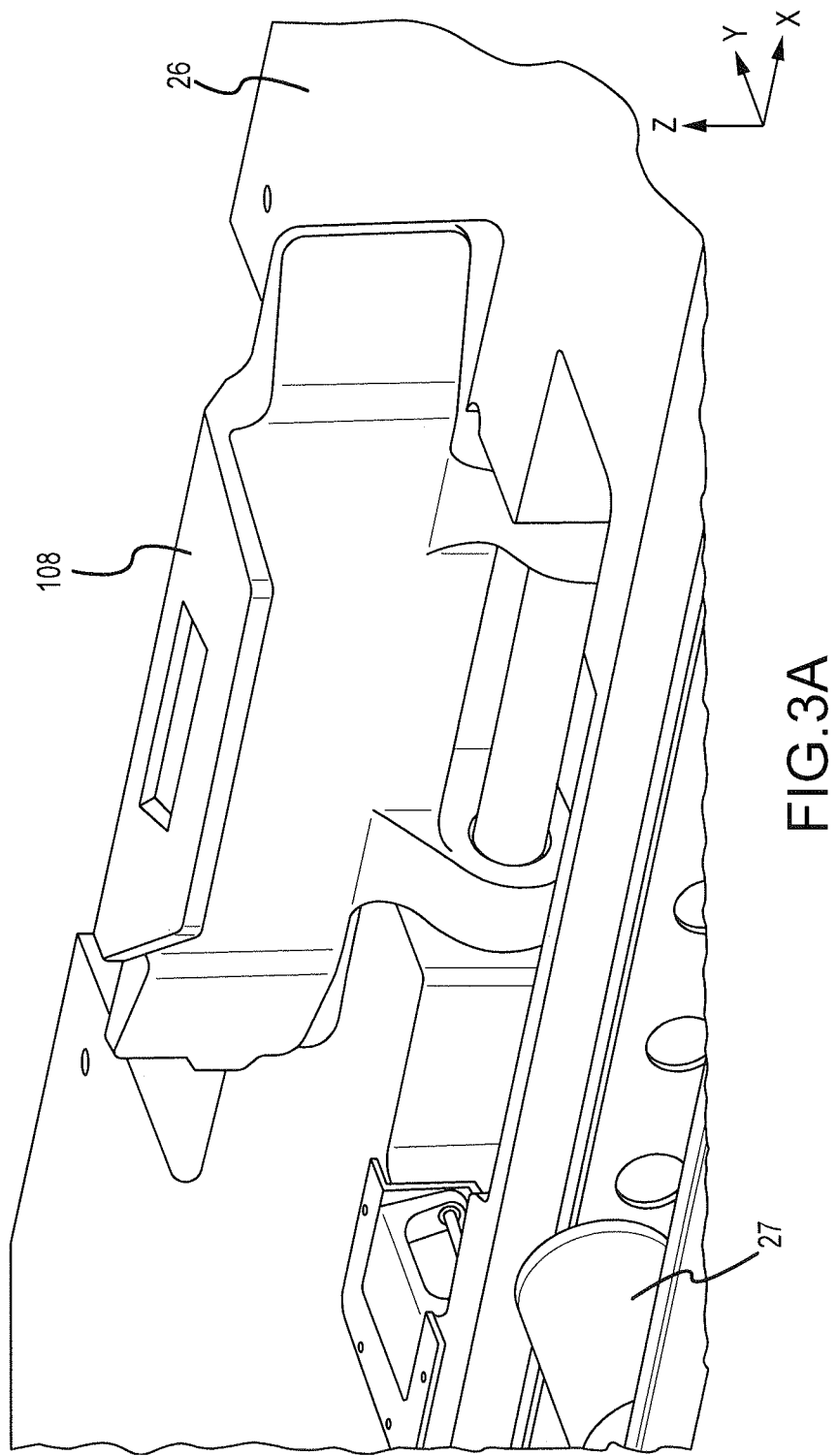

UNDER FLOOR STORED PALLET SEQUENTIAL/INDEPENDENT LOCKING SYSTEM

FIELD

The present disclosure is directed to cargo loading systems for aircraft and, more particularly, to a cargo restraint system for restraining cargo in a cargo bay of aircraft.

BACKGROUND

Many aircraft have at least one cargo bay designed to receive cargo. Such cargo bays include cargo loading systems that include rollers located on a floor of the cargo bay to provide conveyance for moving a unit load device (ULD, cargo) through the cargo bay. After cargo has been loaded into the cargo bay, it may be desirable to restrain the cargo. Such restraint reduces the likelihood of cargo shifting relative to the cargo bay during taxi, takeoff, and landing. Also, it may also be desirable to selectively restrain and release ULDs.

SUMMARY

Described herein is a cargo restraint system for use with a cargo loading system of an aircraft. The cargo restraint includes a driveshaft having a plurality of drive pins. The cargo restraint system further includes a plurality of first restraints each configured to move between a first position, and a second position. Each of the plurality of first restraints has a head configured to move between the first position in which the head is lowered and each of the plurality of the first restraints do not restrict movement of cargo in the cargo loading system, and the second position in which the head is raised and each of the plurality of the first restraints restricts movement of cargo in the cargo loading system. The cargo restraint system further includes a handle distal from the plurality of first restraints, coupled to the driveshaft, and configured to translate the driveshaft and to actuate to move the respective first restraint between the first position and the second position.

In any of the foregoing embodiments, the plurality of first restraints further includes: a drive disk rotatably coupled to the head and having a notch that is configured to receive a respective drive pin of the plurality of drive pins, and a locking disk configured to be received by the drive disk in response to the head being in the second position in order to lock a respective first restraint in the second position; and actuation of the handle causes the respective drive pin to be received by the notch of the respective first restraint to move the respective first restraint between the first position and the second position.

In any of the foregoing embodiments, the drive disk includes a first drive disk having a first circumferential notch and a second drive disk having a plurality of second circumferential notches each having a smaller dimension than the first circumferential notch.

Any of the foregoing embodiments may further include a shaft configured to be rotatably coupled to the head via at least one fastener, wherein: each of the first drive disk and the second drive disk include a tab extending radially outward from the first drive disk and the second drive disk; and the shaft defines a shaft notch configured to receive the tab of the first drive disk and the second drive disk to rotatably couple the first drive disk and the second drive disk to the shaft and to the head.

In any of the foregoing embodiments, the locking disk includes an axial tab configured to be received by at least one of the plurality of the second circumferential notches in response to the head being in the second position; and the locking disk includes a radial tab configured to be received by the shaft notch in response to the head being in the second position.

In any of the foregoing embodiments, the respective drive pin is further configured to displace the axial tab out of the at least one of the plurality of the second circumferential notches in order to allow the respective first restraint to actuate from the second position to the first position.

Any of the foregoing embodiments may further include an end piece; and a spring located between the end piece and the locking disk and configured to exert a force on the locking disk to cause the axial tab to remain in the at least one of the plurality of the second circumferential notches and to cause the radial tab to remain in the shaft notch in response to the head being in the second position in order to lock the head in the second position.

In any of the foregoing embodiments, each of the locking disk, the first drive disk, and the second drive disk include pin notches configured to allow the respective drive pin to move axially relative to the locking disk, the first drive disk, and the second drive disk.

Any of the foregoing embodiments may further include a retainer configured to be coupled to the end piece and to provide a surface on which the spring can exert a force.

Any of the foregoing embodiments may further include a control region located proximate to the handle and having indicators each corresponding to one of the plurality of the first restraints, wherein the driveshaft includes a control pin configured to manipulate each of the indicators to indicate whether each of the plurality of the first restraints is in the first position or the second position.

Any of the foregoing embodiments may further include a second restraint of a different type than the plurality of first restraints, the second restraint defining a slot configured to receive an axial end of the driveshaft such that rotation of the driveshaft actuates the second restraint between a second, or lowered, position and a first, or raised, position.

In any of the foregoing embodiments, the second restraint further includes: a cog with at least two edges rotatably coupled to the second restraint; an element configured to interface with the cog; and a spring configured to exert a force on the cog towards the element to lock the second restraint in the second position in response to the cog interfacing with the element.

In any of the foregoing embodiments, the handle is configured to telescope and has a home position in which the plurality of drive pins of the driveshaft do not interface with any of the plurality of the first restraints, and in which an axial end of the driveshaft does not interface with the notch.

Also disclosed is a cargo restraint system for use with a cargo loading system of an aircraft. The cargo restraint system includes a driveshaft having a plurality of drive pins. The cargo restraint system further includes a plurality of first restraints each configured to actuate between a lowered position and a raised position in which each of the plurality of the first restraints restricts movement of cargo in the cargo loading system. Each of the plurality of first restraints has a head configured to actuate between the lowered position and the raised position, a drive disk rotatably coupled to the head and having a notch that is configured to receive a respective drive pin of the plurality of drive pins, and a locking disk configured to be received by the drive disk in response to the head being in the raised position in order to lock a respective first restraint in the raised position. The cargo restraint system further includes a second restraint of a different type than the plurality of first restraints, the second restraint defining a slot configured to receive an axial end of the driveshaft such that rotation of the driveshaft actuates the second restraint between a raised position and a lowered position. The cargo restraint system further includes a handle coupled to the driveshaft and configured to translate the driveshaft and to actuate such that the respective drive pin is received by the notch of the respective first restraint to move the respective first restraint between the lowered position and the raised position.

In any of the foregoing embodiments, the drive disk includes a first drive disk having a first circumferential notch and a second drive disk having a plurality of second circumferential notches each having a smaller dimension than the first circumferential notch.

Any of the foregoing embodiments may further include a shaft configured to be rotatably coupled to the head via at least one fastener, wherein: each of the first drive disk and the second drive disk include a tab extending radially outward from the first drive disk and the second drive disk; and the shaft defines a shaft notch configured to receive the tab of the first drive disk and the second drive disk to rotatably couple the first drive disk and the second drive disk to the shaft and to the head.

In any of the foregoing embodiments, the locking disk includes an axial tab configured to be received by at least one of the plurality of the second circumferential notches in response to the head being in the raised position; and the locking disk includes a radial tab configured to be received by the shaft notch in response to the head being in the raised position.

In any of the foregoing embodiments, the respective drive pin is further configured to displace the axial tab out of the at least one of the plurality of the second circumferential notches in order to allow the respective first restraint to actuate from the raised position to the lowered position.

Any of the foregoing embodiments may further include an end piece; and a spring located between the end piece and the locking disk and configured to exert a force on the locking disk to cause the axial tab to remain in the at least one of the plurality of the second circumferential notches and to cause the radial tab to remain in the shaft notch in response to the head being in the raised position in order to lock the head in the raised position.

In any of the foregoing embodiments, each of the locking disk, the first drive disk, and the second drive disk include pin notches configured to allow the respective drive pin to move axially relative to the locking disk, the first drive disk, and the second drive disk.

Also disclosed is a cargo restraint system for use with a cargo loading system of an aircraft. The cargo restraint system includes a driveshaft having a plurality of drive pins. The cargo restraint system further includes a plurality of first restraints each configured to actuate between a lowered position and a raised position in which each of the plurality of the first restraints restricts movement of cargo in the cargo loading system. Each of the plurality of first restraints has a head configured to actuate between the lowered position and the raised position, a drive disk rotatably coupled to the head and having a notch that is configured to receive a respective drive pin of the plurality of drive pins, and a locking disk configured to be received by the drive disk in response to the head being in the raised position in order to lock a respective first restraint in the raised position. The cargo restraint system further includes a second restraint of a different type than the plurality of first restraints, the second restraint defining a slot configured to receive an axial end of the driveshaft such that rotation of the driveshaft actuates the second restraint between a raised position and a lowered position. The second restraint includes a cog with at least two edges rotatably coupled to the second restraint, an element configured to interface with the cog, and a spring configured to exert a force on the cog towards the element to lock the second restraint in the raised position in response to the cog interfacing with the element. The cargo restraint system further includes a handle coupled to the driveshaft and configured to translate the driveshaft and to actuate such that the respective drive pin is received by the notch of the respective first restraint to move the respective first restraint between the lowered position and the raised position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIGS. 3A and 3B illustrate a third restraint of the cargo restraint system of FIG. 2, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
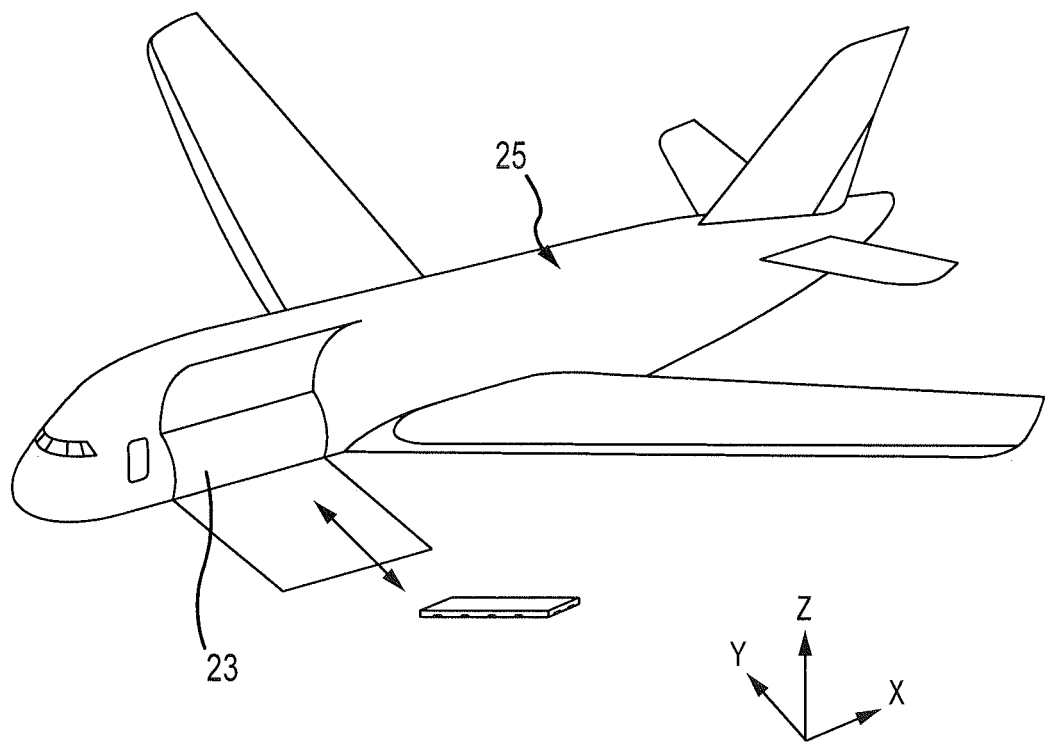
FIG. 1 illustrates an axonometric view of an aircraft being loaded with cargo, in accordance with various embodiments.
Figure 2:
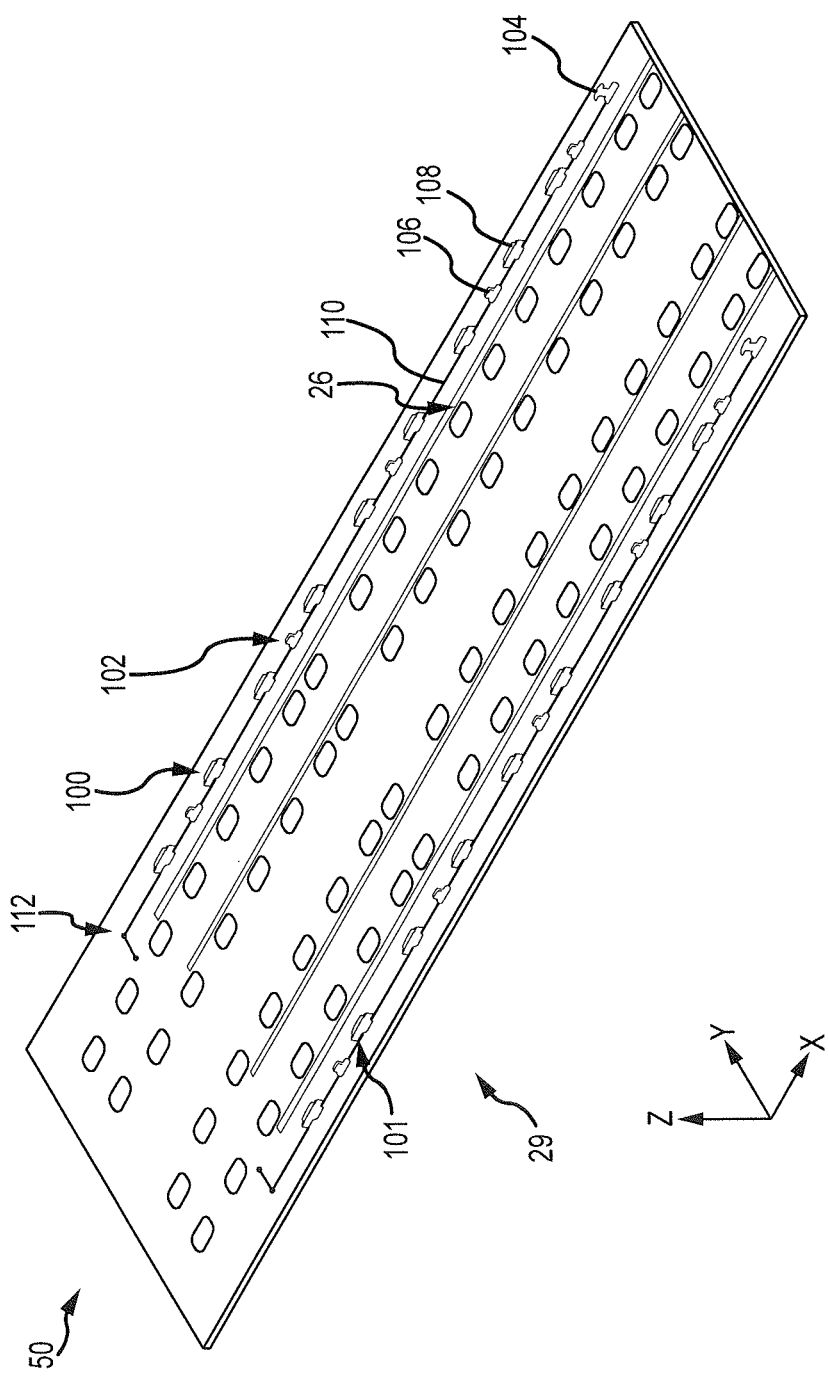
FIG. 2 illustrates a portion of an aircraft cargo deck having a cargo restraint system, in accordance with various embodiments.

FIG. 1 illustrates an aircraft 25 and FIG. 2 illustrates an aircraft cargo deck 29 and cargo loading system 50 that can be used to implement various embodiments of the present disclosure. An X-Y-Z axis is shown in various drawings to illustrate various orientations of components.

A compartment floor 26 forms a deck of an aircraft, adjacent a cargo bay loading door 23. However, there are many other aircraft cargo deck configurations to which the embodiments of the disclosure can be implemented. For example, various aircraft, particularly those configured primarily for the transportation of cargo without passengers, have the upper passenger deck removed and an additional larger cargo deck installed. As another example, an aircraft may include a cargo loading door at any location of the aircraft (e.g., instead of, or in addition to, the cargo bay loading door 23 on the left side of the aircraft 25). Other aircraft may have three or more parallel longitudinal tracks.

The cargo compartment includes a cargo loading system comprising a plurality of freely rotating conveyance rollers 27 mounted in the cargo deck to define the conveyance plane. Cargo loaded onto the aircraft cargo deck can be moved manually throughout the cargo bay upon the freely rotating conveyance rollers.

Referring to FIG. 2, the cargo loading system 50 may include a cargo restraint system 101 used to restrain cargo (e.g., unit load devices (ULDs)) within the aircraft cargo deck 29. The cargo restraint system 101 may include a plurality of first restraints 102, a plurality of third restraints 100, and one or more second restraint 104. In various embodiments, one or more of the first restraints 102, the second restraints 104, and the third restraints 100 may be included. The first restraints 102 may include a first restraint 106 and may be referred to as X-restraints as they may restrict cargo along the X direction. The second restraint 104 may be referred to as a Z-restraint as it may restrict cargo along the Z direction. The third restraints 100 may include a third restraint 108 and may be referred to as YZ-restraints as they may restrict cargo along the Z direction and the Y direction. However, one skilled in the art will realize that the restraints 102, 104, 106 may be used to restrain cargo in any other directions (e.g., the first restraints 102 may restrain cargo along the Y direction, the Z direction, or the like). The restraint system may include a control region 112 usable to control the first restraints 102 and the second restraint 104.

Figure 3B:
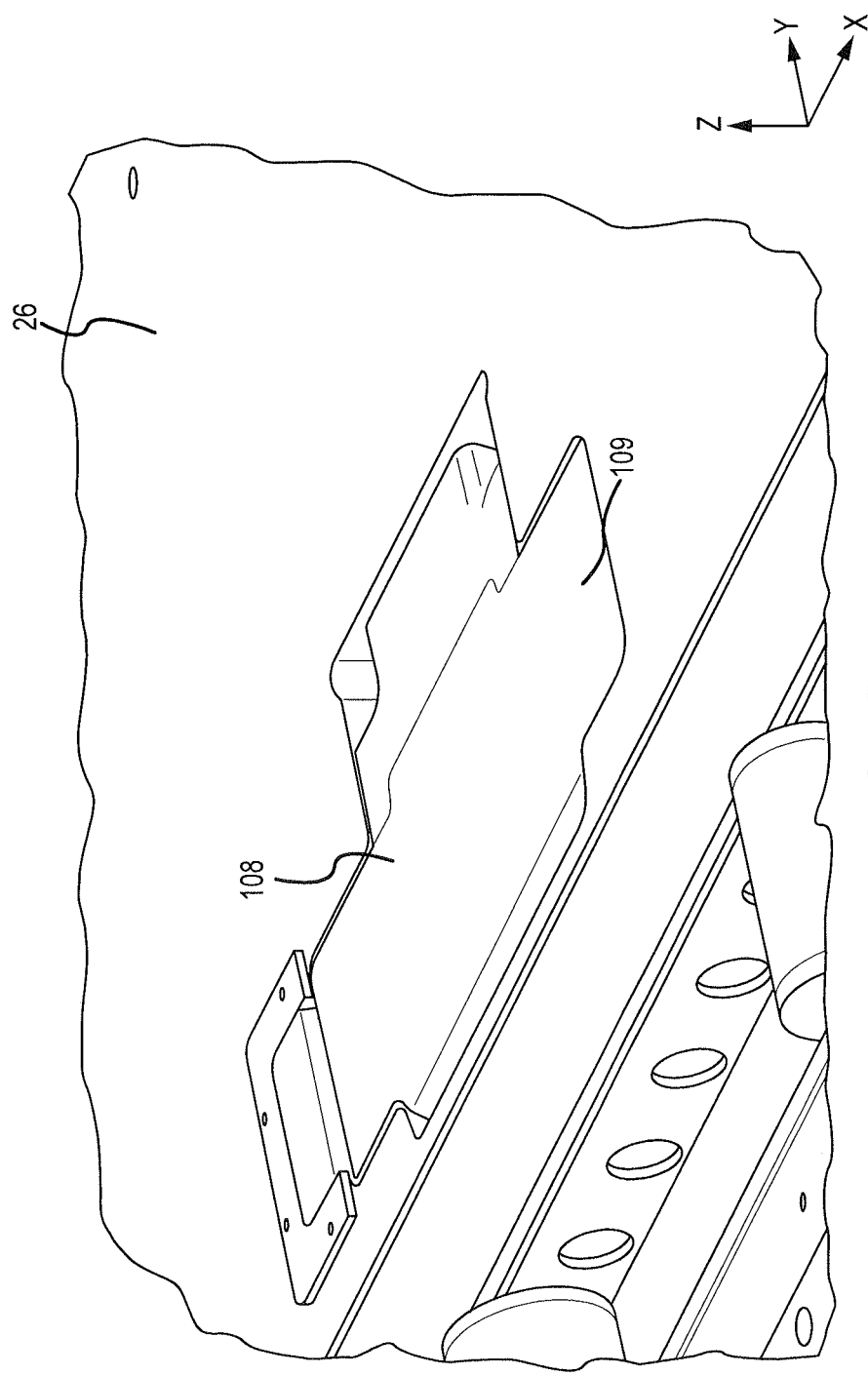

Referring now to FIGS. 3A and 3B, additional details of the third restraint 108 are shown. As shown the third restraint 108 may be in a raised position (as shown in FIG. 3A) and in a lowered position (as shown in FIG. 3B). In response to the third restraint 108 being in the lowered position, the third restraint 108 may be stored within the compartment floor 26 such that a top surface 109 of the third restraint 108 is flush with the compartment floor 26. The third restraint 108 may be manually actuated between the raised position and the lowered position by raising or lowering the third restraint 108. In various embodiments, the third restraint 108 may be spring biased to the raised position and latched in the lowered position, or vice versa.

Figure 3C:
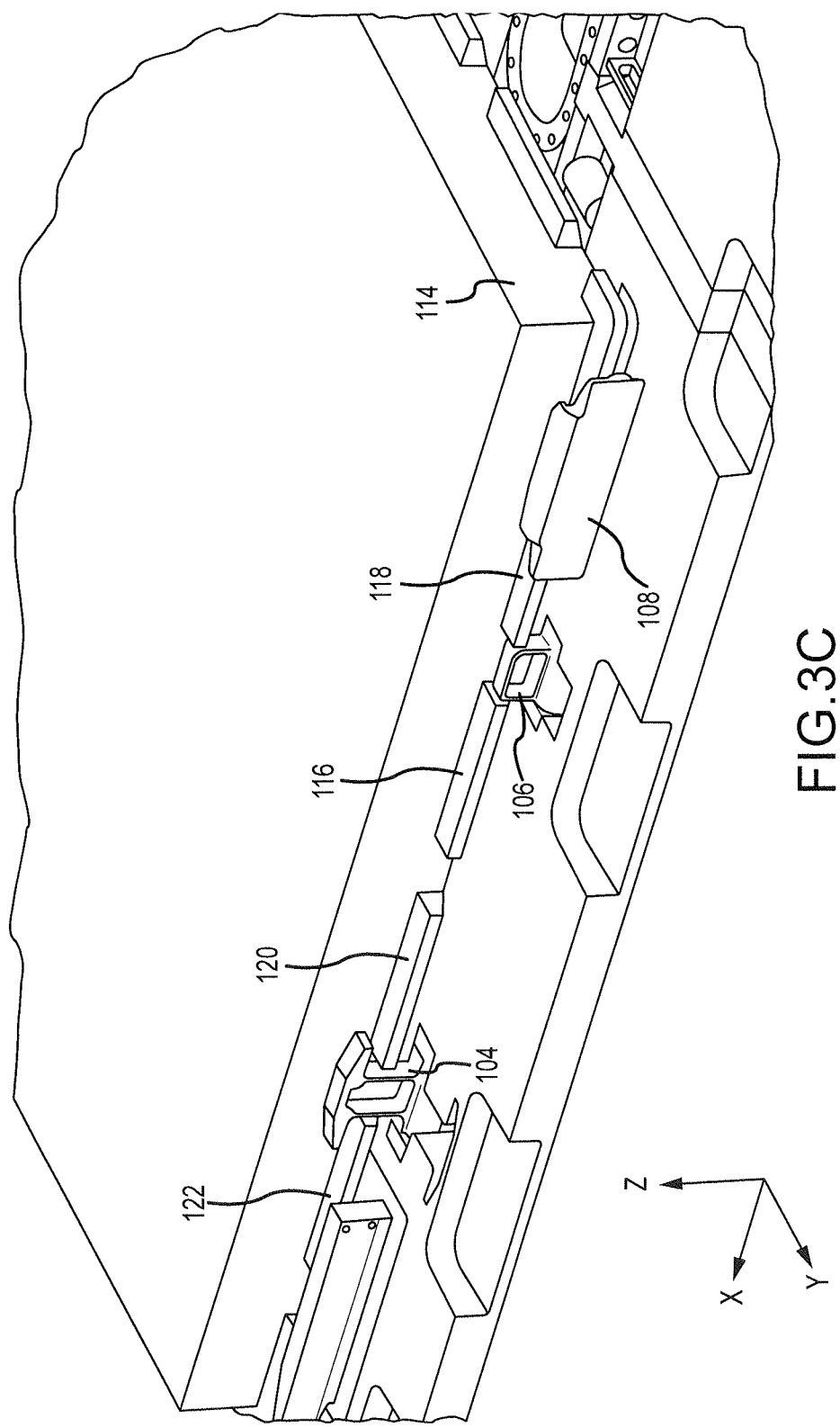
FIG. 3C illustrates a portion of the cargo restraint system of FIG. 2 including the first, second, and third restraints of FIGS. 3A and 3B, in accordance with various embodiments.

FIG. 3C illustrates how the various restraints may restrain a ULD 114. As shown, the first restraint 106 may rest between tabs 116, 118 of the ULD 114, restricting movement of the ULD 114 along the X direction. The third restraint 108 may rest adjacent and above the tab 118, thus restricting movement of the ULD 114 in the Y and Z directions. The second restraint 104 may rest above tabs 120, 122 of the ULD 114, thus restricting movement of the ULD 114 in the Z direction.

Figure 4A:
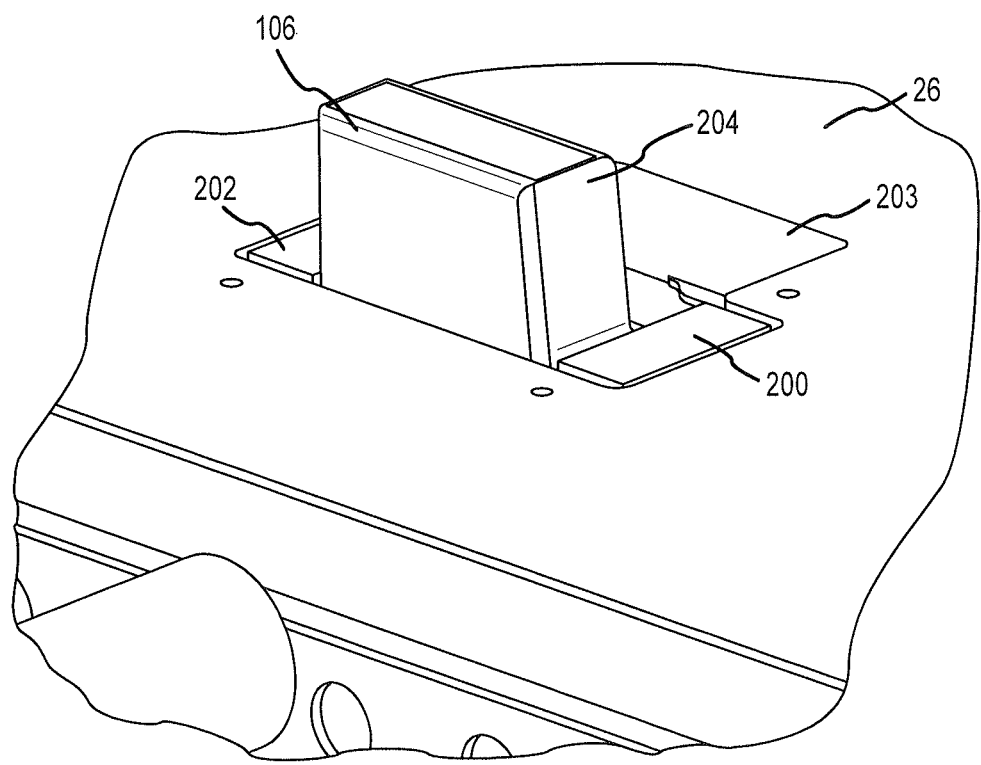
FIGS. 4A, 4B, 4C, 4D, and 4E illustrate various views of a first restraint of the cargo restraint system of FIG. 2, in accordance with various embodiments.
Figure 4B:
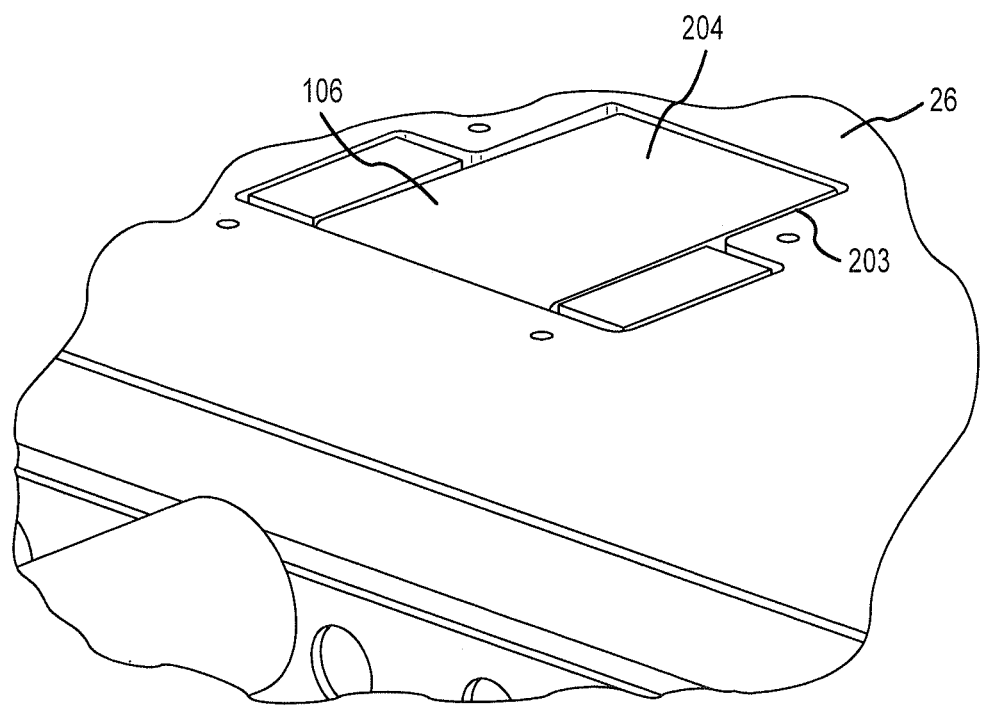
Figure 4C:
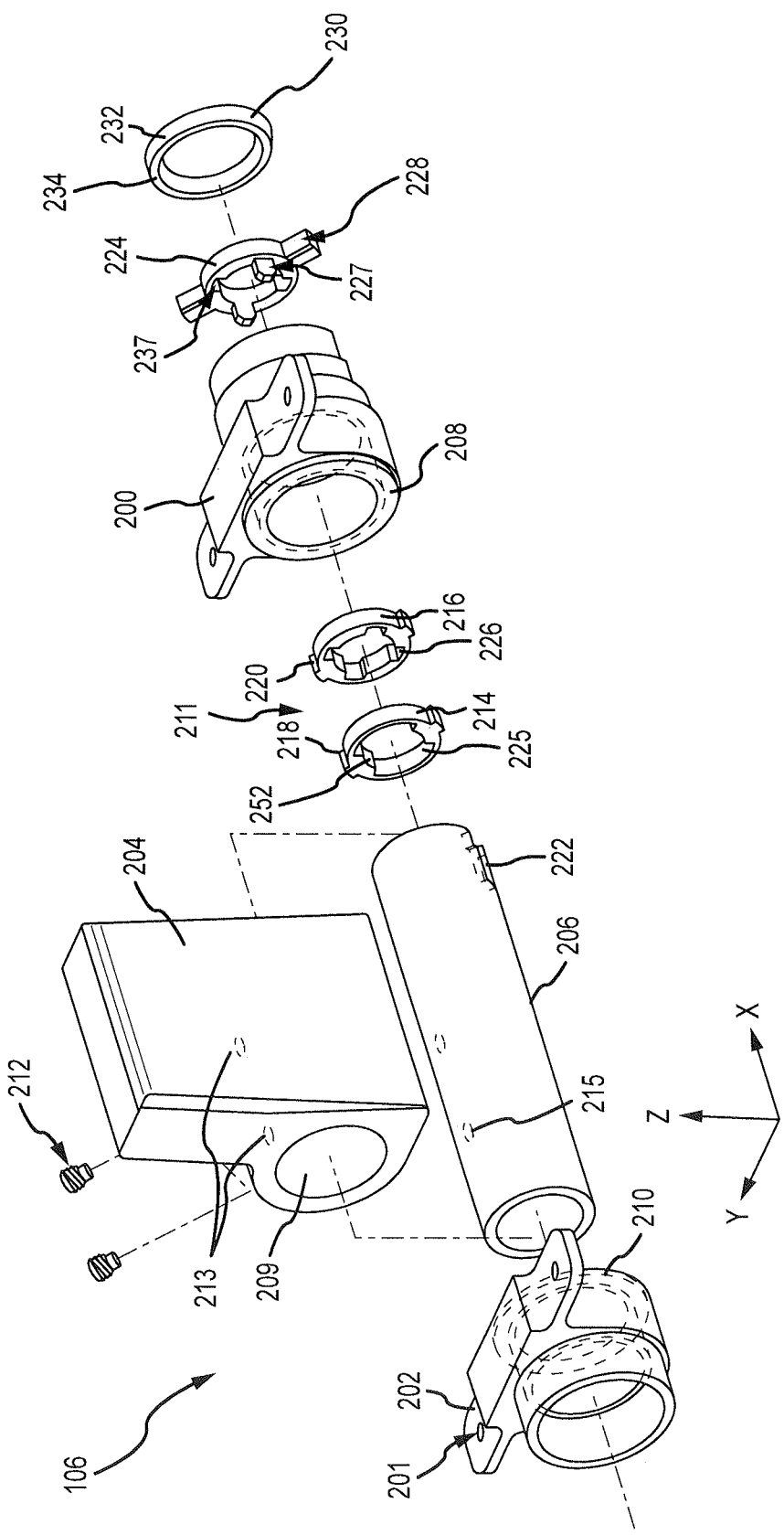
Figure 4D:
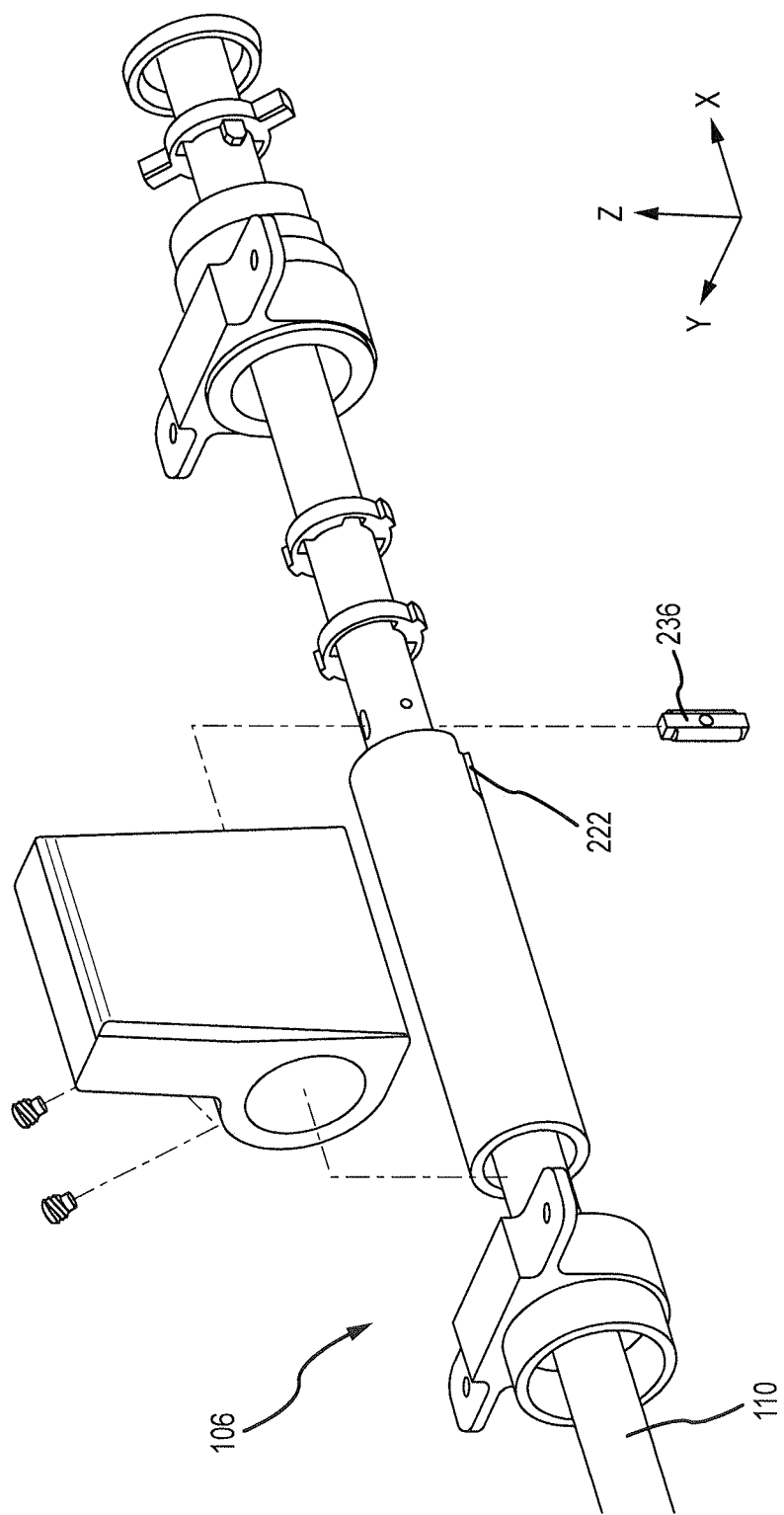
Figure 4E:
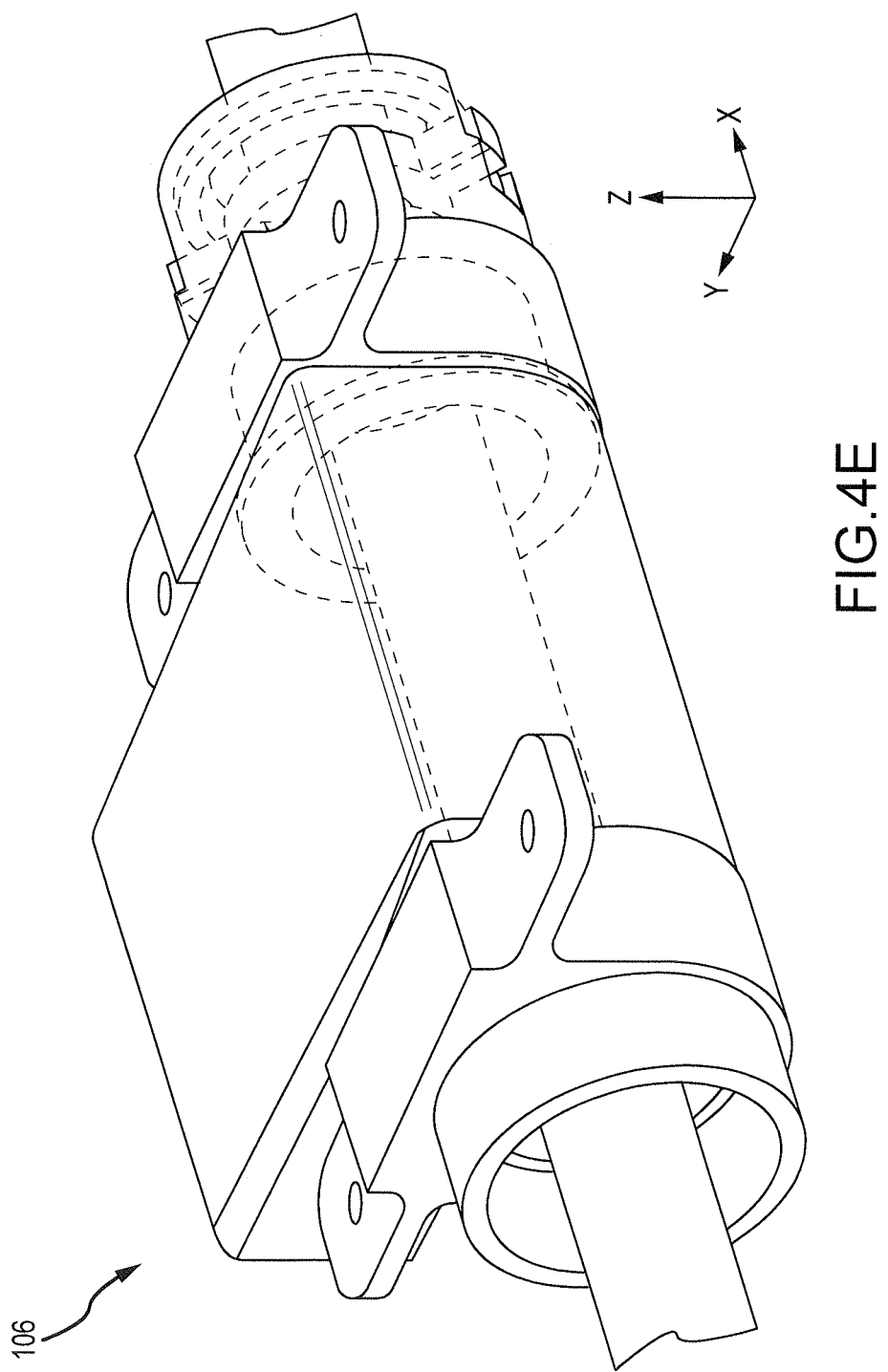

Referring now to FIGS. 4A, 4B, 4C, 4D, and 4E, additional details of the first restraint 106 are shown. As shown, the first restraint 106 may be actuated between a raised position (as shown in FIG. 4A) and a lowered position (as shown in FIG. 4B). The first restraint 106 may be manipulated using the control region 112 of FIG. 2.

The first restraint 106 may include a head 204 which may be raised or lowered. In response to the head 204 being raised, it may rise above the compartment floor 26. In response to the head 204 being lowered, it may fit within an opening 203 of the compartment floor 26, thus causing it to lay relatively flush with the compartment floor 26. The first restraint 106 may further include a first end piece 200 and a second end piece 202 which may be designed to be fastened to the compartment floor 26, such as by using fasteners through apertures 201 of the end pieces 200, 202 and matching apertures in the compartment floor 26.

The first restraint 106 may further include a shaft 206. The shaft 206 may fit within an aperture 209 of the head 204 and may be fastened to the head 204. A first drive disk 214 and a second drive disk 216 may fit within the shaft 206. In that regard, the head 204, the shaft 206, the first drive disk 214, and the second drive disk 216 may each actuate relative to the first end piece 200 and the second end piece 202, such as by rotating relative to the first end piece 200 and the second end piece 202. For example, fasteners 212 may extend through threaded apertures 213 of the head 204 and through apertures 215 of the shaft 206, thus coupling the head 204 to the shaft 206. The first drive disk 214 and the second drive disk 216 may include radial tabs 218, 220 which fit within shaft notches 222 of the shaft 206, thus coupling the drive disk 214, 216 to the shaft 206 (and thus the head 204).

The first end piece 200 may include a first bushing 208, and the second end piece 202 may include a second bushing 210. The axial ends of the shaft 206 may fit within the bushings 208, 210, thus allowing the shaft 206 to actuate relative to the end pieces 200, 202.

The first restraint 106 may further include a locking disk 224, along with a snap (or retaining) ring 232, a washer 234, and a spring 230 located between the washer 234 and the locking disk 224. In various embodiments, the snap ring 232 and the washer 234 may be replaced with any retainer or retaining element or group of elements. The snap ring 232 may be coupled to the end piece 200 via the snap effect (or other locking mechanism of the snap ring 232) of the snap ring 232. For example, in response to being installed in the end piece 200, the snap ring 232 may expand within the end piece 200, thus coupling the snap ring 232 within the end piece 200. The spring 230 may exert a force on the locking disk 224 and the washer 234 (i.e., forcing the locking disk 224 away from the washer 234 and, thus, the end piece 200).

The first drive disk 214 may include one or more first circumferential notches 225 formed on an inner surface of the first drive disk 214, and the second drive disk 216 may include one or more second circumferential notches 226 formed on an inner surface of the second drive disk 216. In various embodiments, the first drive disk 214 and the second drive disk 216 may be formed as a single drive disk 211. The first circumferential notch 225 may have a greater circumferential distance than the second circumferential notch 226. The shaft 206 may include one or more locking notch 222 extending axially along the shaft 206.

The locking disk 224 may include one or more axial tabs 227 extending towards the second end piece 202 along with one or more radial tabs 228 extending radially outward from the locking disk 224. The locking disk 224 may be coupled to the first end piece 200 such that rotation of the shaft 206 does not actuate the locking disk 224. In response to the head 204 being in the raised position, the spring 230 may exert a force on the locking disk 224 towards the second end piece 202. In response to this force and in response to the head 204 being in the raised position, the axial tabs 227 of the locking disk 224 may align with and fit within one or more of the second circumferential notches 226, and the radial tabs 228 may align with and fit within one or more of the locking notches 222. This locks the head 204 in the raised position, resisting rotation of the head 204 back to the lowered position.

The driveshaft 110 may include one or more drive pin 236 coupled thereto. Each of the locking disk 224, the first drive disk 214, and the second drive disk 216 may include pin notches 237 through which the drive pin 236 may move. In response to the first restraint 106 being in the lowered position, the drive pin 236 may be manipulated through the pin notches 237 and aligned with an inner tab 252 of the first drive disk 214. In various embodiments, the first drive disk 214 may include two or more inner tabs 252 such that the first circumferential notches 225 are defined between the inner tabs 252.

In order to manipulate the head 204 from the lowered position to the raised position, the drive pin 236 may be aligned with the inner tab 252 of the first drive disk 214 (via axial translation of the driveshaft 110). The driveshaft 110 may then be actuated (e.g., rotated) in a direction corresponding to the desired direction of rotation of the head 204 (i.e., rotating the head 204 away from the compartment floor 26 into the raised position). Such rotation of the driveshaft 110 actuates the first drive disk 214 which in turn actuates the second drive disk 216, the shaft 206, and the head 204. In response to the head 204 being in the raised position, the locking disk 224 may lock the head 204 in the raised position as described above.

In order to manipulate the head 204 from the raised position to the lowered position, the drive pin 236 may again be aligned with the inner tab 252 of the first drive disk 214. The driveshaft 110 may then be translated along the X direction such that the drive pin 236 exerts a force through one or more of the second circumferential notches 226 on the axial tabs 227 (i.e., in the X direction). This force counteracts the force of the spring 230, thus urging or displacing the axial tabs 227 out the second circumferential notches and urging or displacing the radial tabs 228 out of the locking notches 222. The driveshaft 110 may then be actuated (e.g., rotated) in a direction corresponding to the desired direction of rotation of the head 204 (i.e., rotating the head 204 towards and into the compartment floor 26).

Figure 5A:
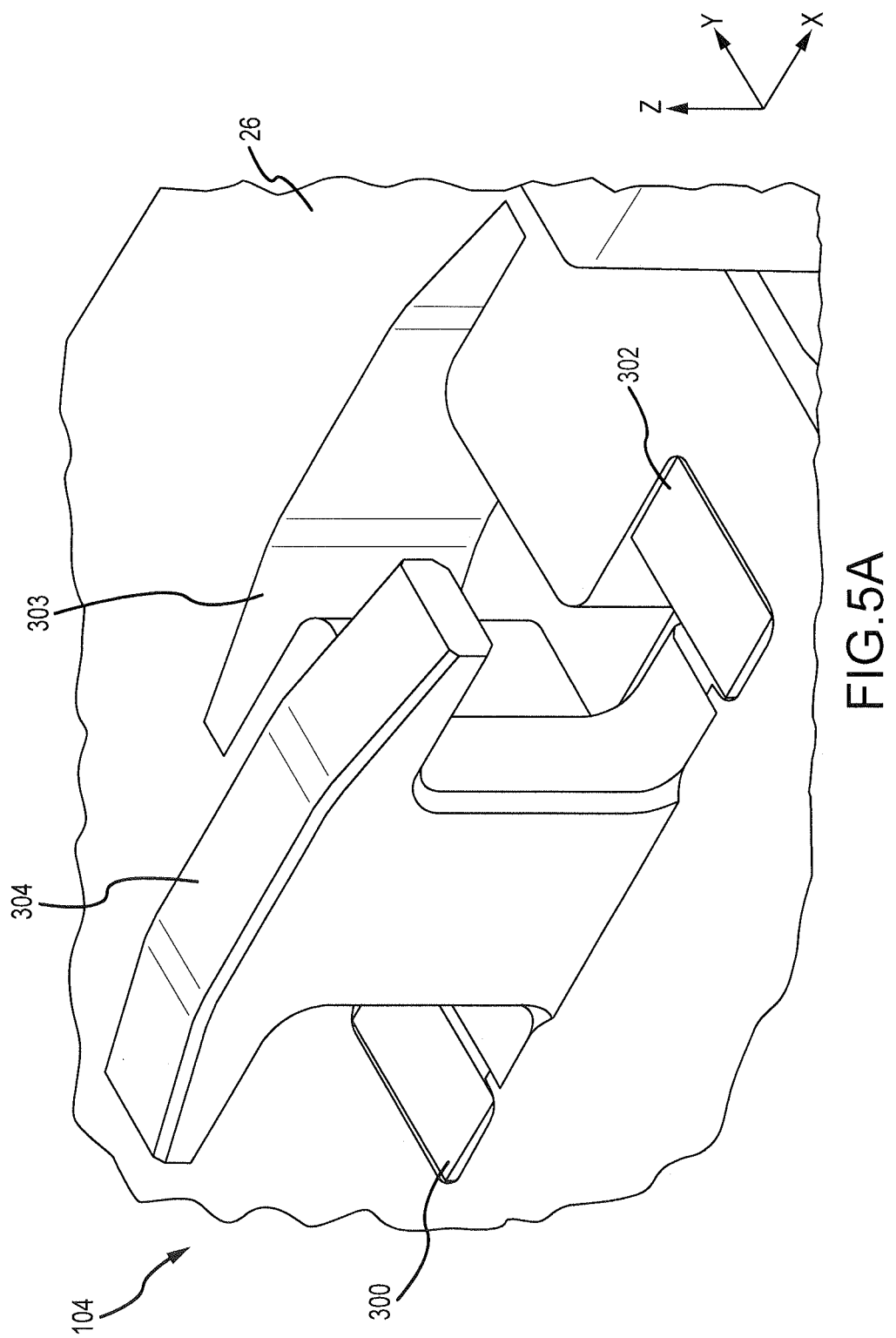
FIGS. 5A, 5B, 5C, and 5D illustrate various views of a second restraint of the cargo restraint system of FIG. 2, in accordance with various embodiments.
Figure 5B:
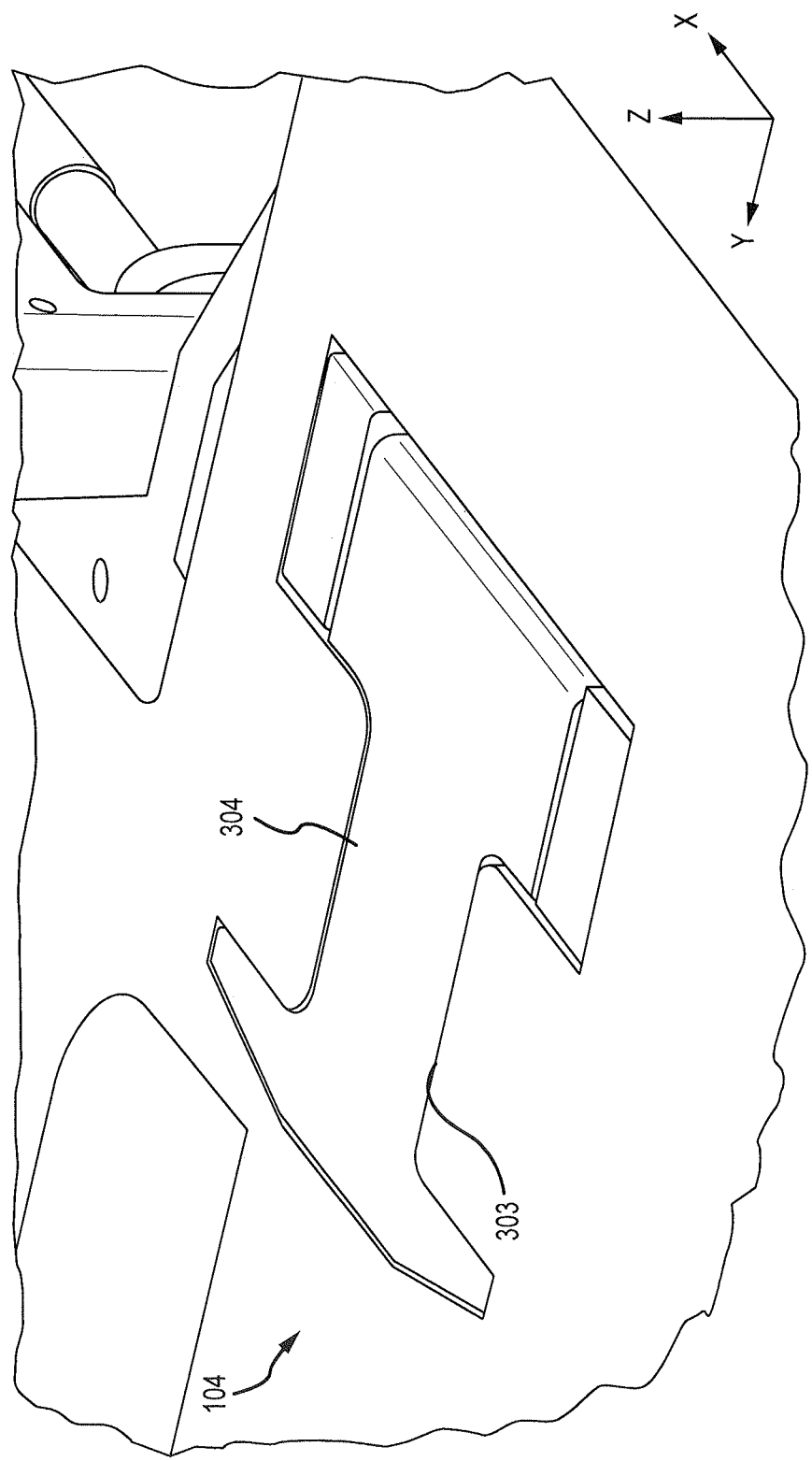
Figure 5C:
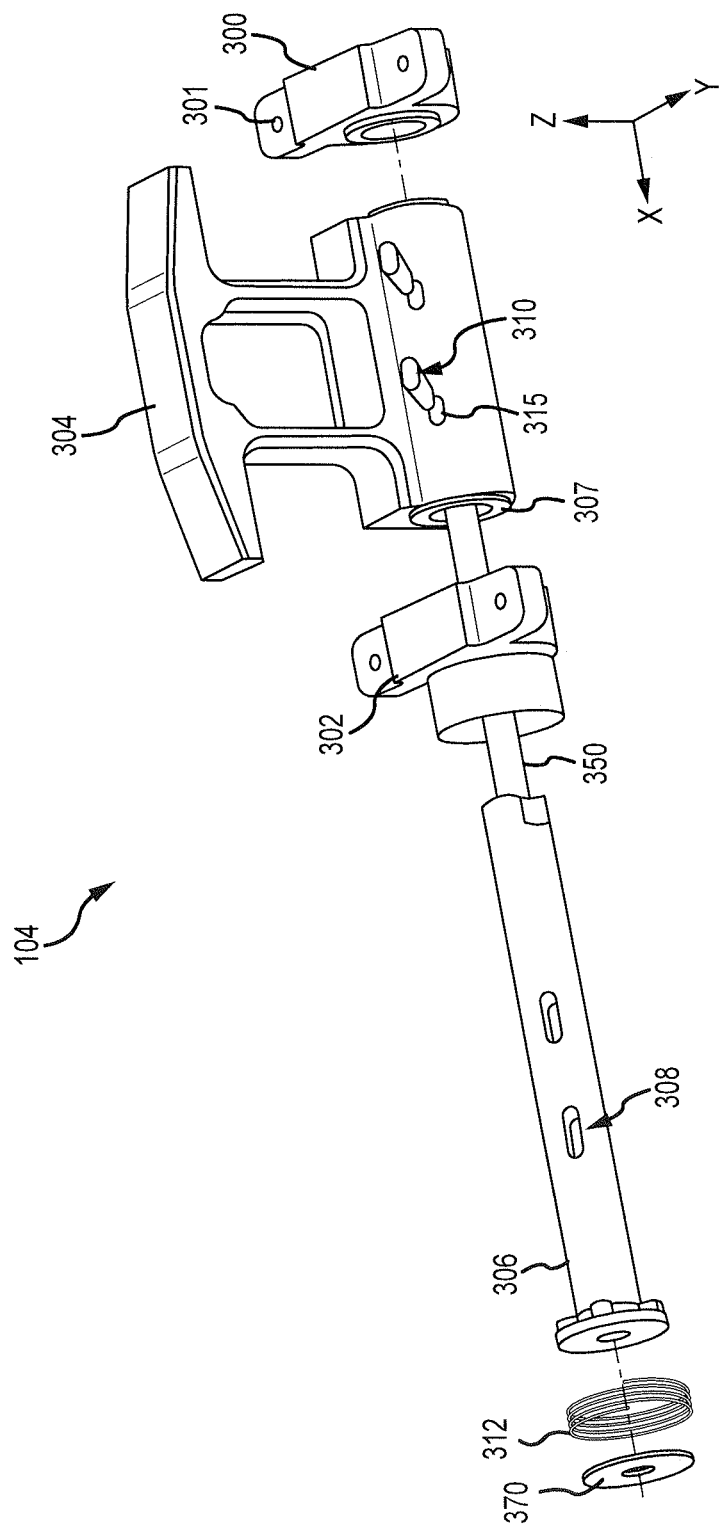
Figure 5D:
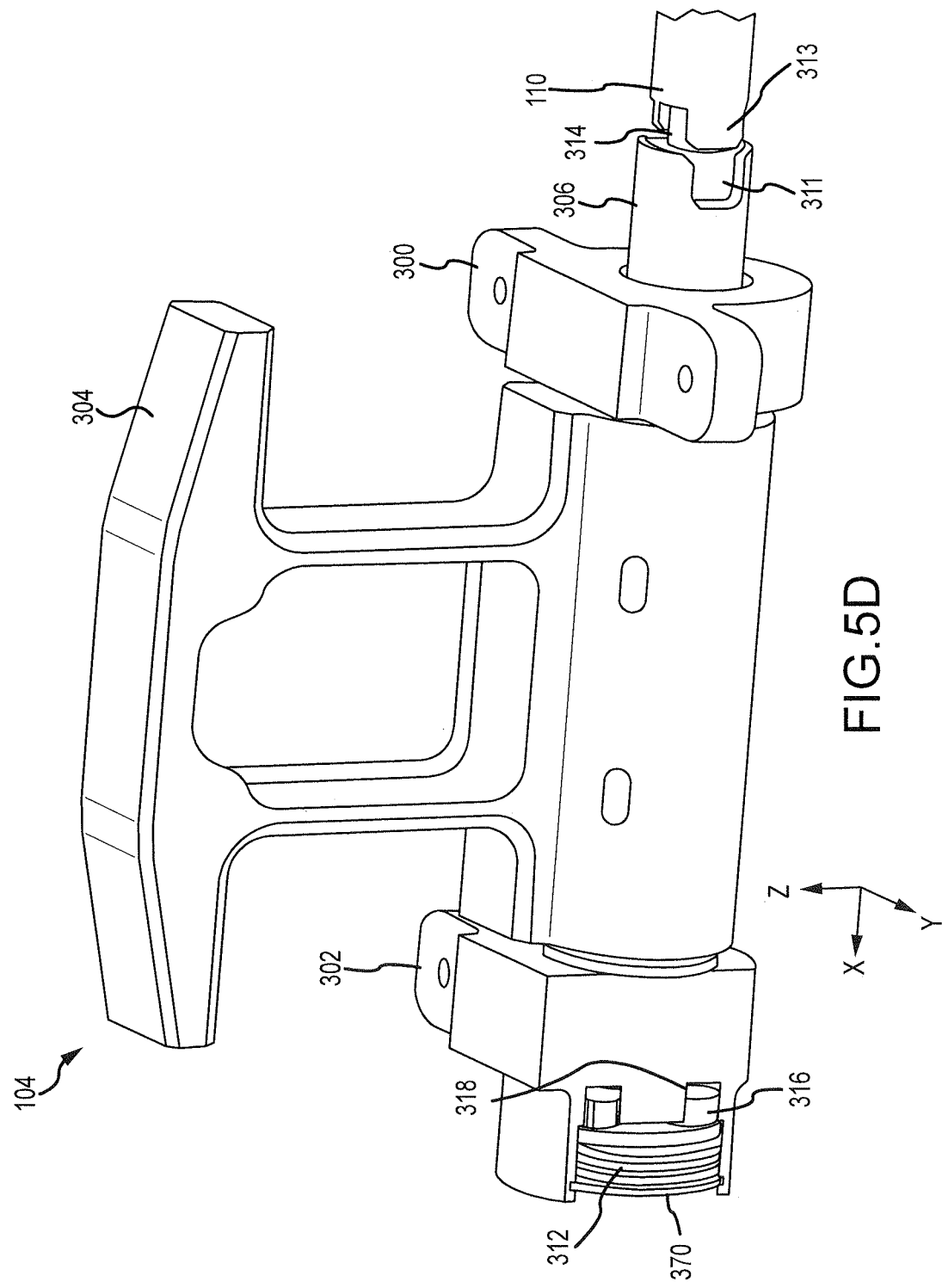

Turning to FIGS. 5A, 5B, 5C, and 5D, additional details of the second restraint 104 are shown. As shown, the second restraint 104 may be manipulated between a raised position (as shown in FIG. 5A) and a lowered position (as shown in FIG. 5B). The second restraint 104 may be manipulated using the control region 112 of FIG. 2.

The second restraint 104 may include a head 304 which may be raised or lowered. In response to the head 304 being raised, it may rise above the compartment floor 26 to restrict cargo. In response to the head 304 being lowered, it may fit within an opening 303 of the compartment floor 26, thus causing it to lay relatively flush with the compartment floor 26. The second restraint 104 may further include a first end piece 300 and a second end piece 302 which may be fastened to the compartment floor 26, such as by using fasteners through apertures 301 of the end pieces 300, 302 and corresponding apertures of the compartment floor 26.

The second restraint 104 may further include a shaft 306. The shaft 306 may fit within an aperture 307 of the head 304. The shaft 306 may be fastened to the head 304, for example, by using fasteners 310 through apertures 315 of the head 304 and apertures 308 of the shaft 306. This may rotatably couple the shaft 306 to the head 304, and may still allow translation of the shaft 306 relative to the head 304.

The second restraint 104 may further include a retaining ring 370 and a spring 312 designed to exert a force on a cog 316, which may transfer the force to the shaft 306 in a direction towards the first end piece 300. The cog 316 may be designed to interface with an element 318 having at least two edges (e.g., having shape corresponding to a square, a triangle, a rectangle, or the like). In various embodiments, the element 318 may be coupled to, or formed integral with, the second end piece 302. The interface between the cog 316 and the element 318 may resist rotation of the head 304 relative to the end pieces 300, 302. In that regard, the head 304 may be locked in the raised position or the lowered position due to the interface between the cog 316 and the element 318, and the spring 312 may resist separation of the cog 316 and the element 318. In various embodiments, the design of the cog 316 and the element 318 may only facilitate locking the head 304 in the raised position (e.g., the cog 316 may not interface with the element 318 in response to the head 304 being in the lowered position).

The shaft 306 may define a slot 311 on an axial end closest to the driveshaft 110. The shaft 306 and the driveshaft 110 may interface with each other via an interface between the drive shaft tab 313 and the slot 311 of the shaft 306. The driveshaft 110 may be translated axially towards the second restraint 104 to engage the drive shaft tab 313 and the slot 311, and may be translated axially away from the second restraint 104 to disengage the drive shaft tab 313 from the slot 311.

An inner shaft 350 integral to the shaft 306 may extend into driveshaft 110 to provide guidance and support for the driveshaft 110. In order to manipulate or actuate the second restraint 104 from the raised position to the lowered position, the driveshaft 110 may be manipulated (i.e., translated) along the X direction towards the second end piece 302 until it exerts a force on the shaft 306, displacing the cog 316 towards the spring 312. This removes the cog 316 from the element 318, allowing the head 304 to rotate relative to the end pieces 300, 302. The driveshaft 110 may then be actuated (e.g., rotated) in a desired direction (i.e., rotating the head 304 towards the cargo floor 26) until the head 304 is in the lowered position. The driveshaft 110 may then be translated along the X direction away from the second restraint 104, allowing the spring 312 to displace the cog 316 towards the element 318, locking the second restraint 104 in the lowered position.

In order to manipulate or actuate the second restraint 104 from the lowered position to the raised position, the driveshaft 110 may be translated along the X direction towards the second end piece 302 until it exerts a force on the shaft 306, urging or displacing the cog 316 towards the spring 312. This removes the cog 316 from the element 318, allowing the head 304 to actuate relative to the end pieces 300, 302. The driveshaft 110 may then be rotated in a desired direction (i.e., rotating the head 304 away from the compartment floor 26) until the head 304 is in the raised position. The driveshaft 110 may then be translated along the X direction away from the second restraint 104, allowing the spring 312 to urge or displace the cog 316 towards the element 318, locking the second restraint 104 in the raised position.

Referring to FIGS. 2, 6A, 6B, 6C, 6D, and 6E, the system 101 may include multiple first restraints 102 along with one or more second restraint 104. The driveshaft 110 may include one or more drive pin for each of the first restraints 102 which may be staggered along the length of the driveshaft 110 in such a way that control of one of the first restraints 102 does not manipulate any other of the first restraints 102. That is, in response to a first drive pin interfacing with one of the first restraints 102, the remaining drive pins do not interface with any other first restraints 102 (and the driveshaft 110 does not interface with the second restraint 104). Similarly, in response to the driveshaft 110 interfacing with the second restraint 104, the remaining drive pins may not interface with any first restraints 102.

The control region 112 may include a handle 400 coupled to the driveshaft 110 along with instructions 402 usable to manipulate the first restraints 102 and the one or more second restraints 104. In particular, the instructions 402 illustrate how to manipulate the handle 400 to raise or lower each of the first restraints 102 and second restraints 104. Furthermore, the control region 112 includes indicators 406 that each corresponds to one of the first restraints 102 and the second restraint 104.

The driveshaft 110 may further include a control pin 404 located in the control region 112 which manipulate the indicators 406 to signal whether each respective first restraints 102 and second restraint 104 is in the raised position or the lowered position. For example, in response to the control pin 404 being aligned with an indicator 406 that corresponds to the first restraint 106, manipulation of the driveshaft 110 (according to the instructions 402) may manipulate the first restraint 106 between the raised position and the lowered position or vice versa and thus also manipulating the respective indicator to show the restraint status (i.e. raised or lowered). In various embodiments, the control pin 404 may travel through a guide path in a sleeve 405 to control the motion of the driveshaft 110 such that inadvertent motion is restricted. Furthermore, the indicators may be detented into two positions (i.e., raised and lowered).

Figure 6A:
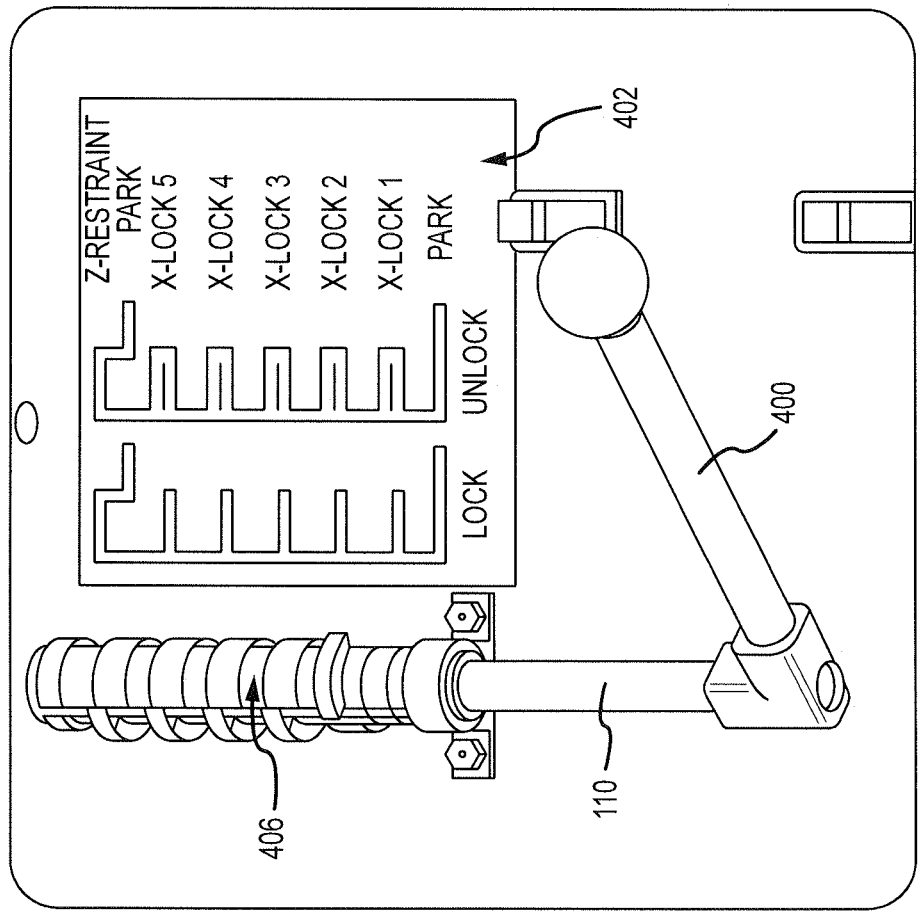
FIGS. 6A, 6B, 6C, 6D, and 6E illustrate various views of a control region of the cargo restraint system of FIG. 2, in accordance with various embodiments.
Figure 6B:
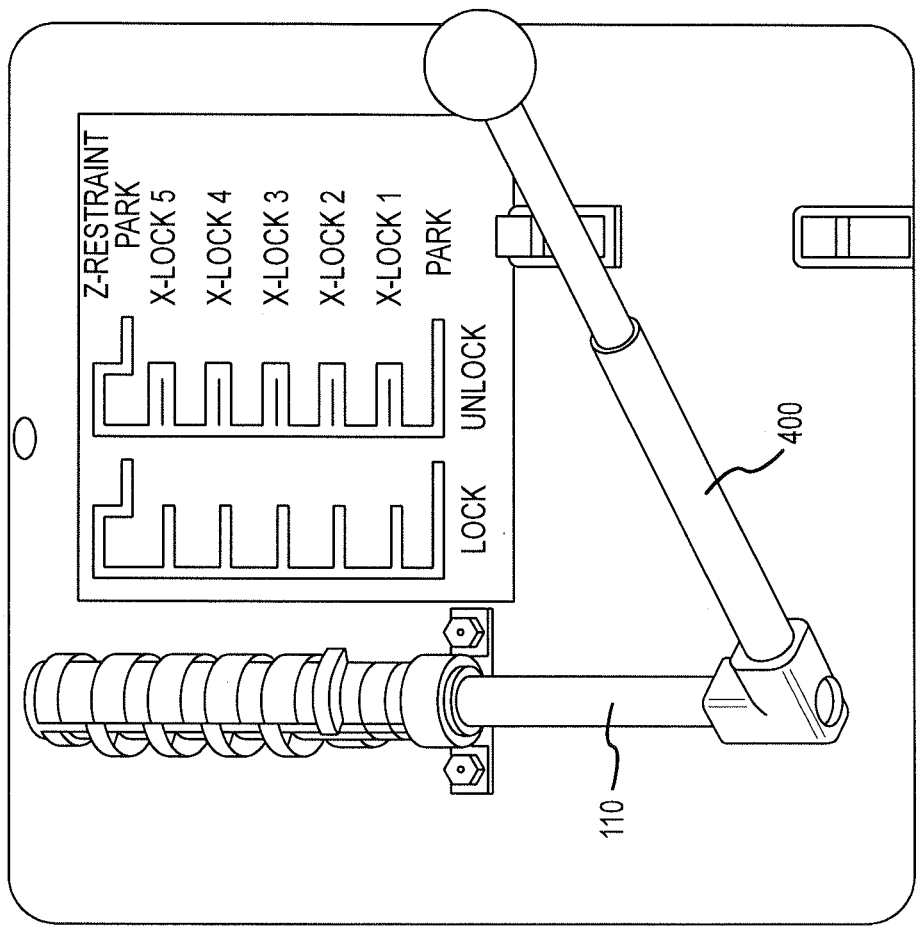
Figure 6C:
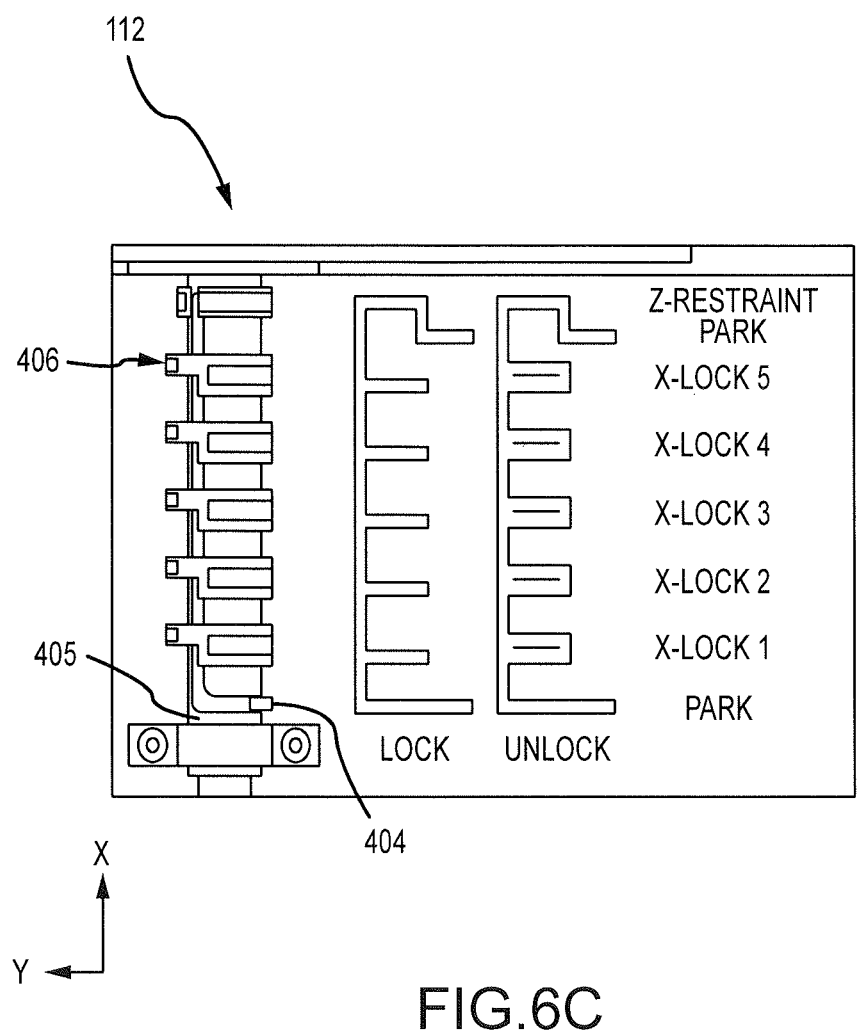

The handle 400 may telescope in (as shown in FIG. 6A) and out (as shown in FIG. 6B) to increase ease of use of the control region 112. Translation and rotation of the handle 400 may translate and rotate the driveshaft 110 (and thus the drive pins) to control operation of the first restraints 102 and the second restraint 104.

Figure 6E:
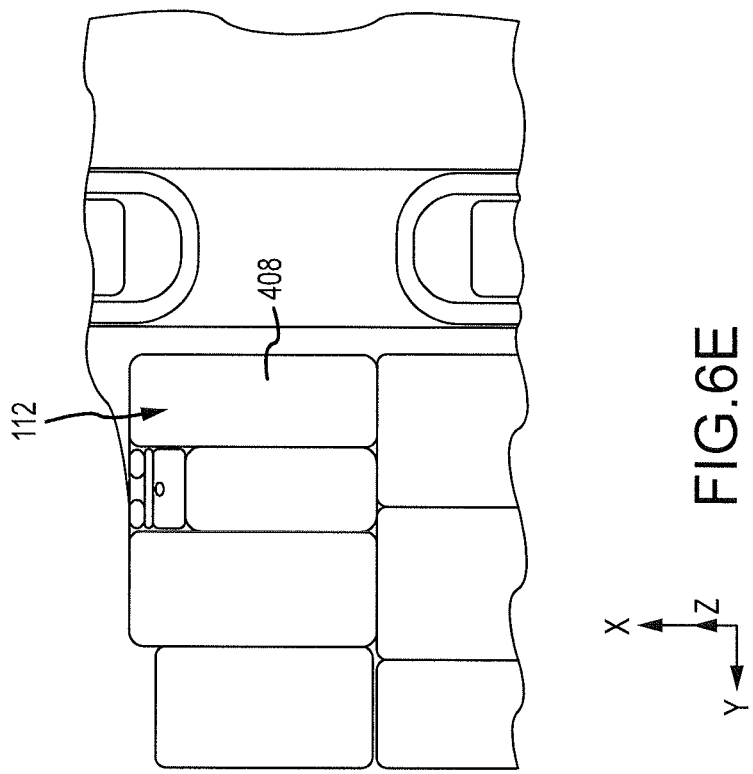
Figure 6D:
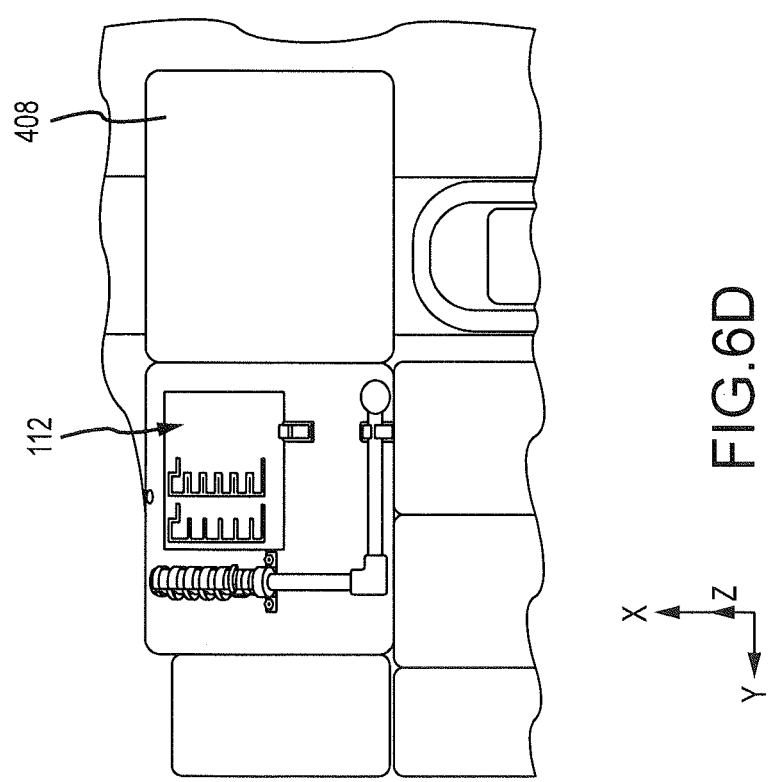

The control region 112 may further include a door 408. The door 408 may be opened (as shown in FIG. 6D) to allow access to the control region 112, and the door 408 may be closed (as shown in FIG. 6E) to restrict access to the control region 112. In various embodiments, the door 408 may be latchable in either orientation. The door 408 may also be spring biased open and latched closed in various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A cargo restraint system for use with a cargo loading system of an aircraft, the cargo restraint system comprising:
   a driveshaft having a plurality of drive pins;
   a plurality of first restraints each configured to move between a first position, and a second position, each of the plurality of first restraints having a head configured to move between the first position in which the head is lowered and each of the plurality of the first restraints do not restrict movement of cargo in the cargo loading system, and the second position in which the head is raised and each of the plurality of the first restraints restricts movement of cargo in the cargo loading system; and
   a handle distal from the plurality of first restraints, coupled to the driveshaft, and configured to translate the driveshaft and to actuate to move the respective first restraint between the first position and the second position.

2. The cargo restraint system of claim 1, wherein:
the plurality of first restraints further includes:
a drive disk rotatably coupled to the head and having a notch that is configured to receive a respective drive pin of the plurality of drive pins, and
a locking disk configured to be received by the drive disk in response to the head being in the second position in order to lock a respective first restraint in the second position; and
actuation of the handle causes the respective drive pin to be received by the notch of the respective first restraint to move the respective first restraint between the first position and the second position.

3. The cargo restraint system of claim 2, wherein the drive disk includes a first drive disk having a first circumferential notch and a second drive disk having a plurality of second circumferential notches each having a smaller dimension than the first circumferential notch.

4. The cargo restraint system of claim 3, further comprising a shaft configured to be rotatably coupled to the head via at least one fastener, wherein:
each of the first drive disk and the second drive disk include a tab extending radially outward from the first drive disk and the second drive disk; and
the shaft defines a shaft notch configured to receive the tab of the first drive disk and the second drive disk to rotatably couple the first drive disk and the second drive disk to the shaft and to the head.

5. The cargo restraint system of claim 4, wherein:
the locking disk includes an axial tab configured to be received by at least one of the plurality of the second circumferential notches in response to the head being in the raised position; and
the locking disk includes a radial tab configured to be received by the shaft notch in response to the head being in the raised position.

6. The cargo restraint system of claim 5, wherein the respective drive pin is further configured to displace the axial tab out of the at least one of the plurality of the second circumferential notches in order to allow the respective first restraint to actuate from the raised position to the lowered position.

7. The cargo restraint system of claim 5, further comprising:
an end piece; and
a spring located between the end piece and the locking disk and configured to exert a force on the locking disk to cause the axial tab to remain in the at least one of the plurality of the second circumferential notches and to cause the radial tab to remain in the shaft notch in response to the head being in the raised position in order to lock the head in the raised position.

8. The cargo restraint system of claim 7, wherein each of the locking disk, the first drive disk, and the second drive disk include pin notches configured to allow the respective drive pin to move axially relative to the locking disk, the first drive disk, and the second drive disk.

9. The cargo restraint system of claim 7, further comprising a retainer configured to be coupled to the end piece and to provide a surface on which the spring can exert a force.

10. The cargo restraint system of claim 2, further comprising a control region located proximate to the handle and having indicators each corresponding to one of the plurality of the first restraints, wherein the driveshaft includes a control pin configured to manipulate each of the indicators to indicate whether each of the plurality of the first restraints is in the first position or the second position.

11. The cargo restraint system of claim 2, further comprising a second restraint of a different type than the plurality of first restraints, the second restraint defining a slot configured to receive an axial end of the driveshaft such that rotation of the driveshaft actuates the second restraint between a first position and a second position.

12. The cargo restraint system of claim 11, wherein the second restraint further includes:
a cog with at least two edges rotatably coupled to the second restraint;
an element configured to interface with the cog; and
a spring configured to exert a force on the cog towards the element to lock the second restraint in the second position in response to the cog interfacing with the element.

13. The cargo restraint system of claim 2, wherein the handle is configured to telescope and has a home position in which the plurality of drive pins of the driveshaft do not interface with any of the plurality of the first restraints, and in which an axial end of the driveshaft does not interface with the notch.

14. A cargo restraint system for use with a cargo loading system of an aircraft, the cargo restraint system comprising:
a driveshaft having a plurality of drive pins;
a plurality of first restraints each configured to actuate between a lowered position and a raised position in which each of the plurality of the first restraints restricts movement of cargo in the cargo loading system, each of the plurality of first restraints having:
a head configured to actuate between the lowered position and the raised position,
a drive disk rotatably coupled to the head and having a notch that is configured to receive a respective drive pin of the plurality of drive pins, and
a locking disk configured to be received by the drive disk in response to the head being in the raised position in order to lock a respective first restraint in the raised position;
a second restraint of a different type than the plurality of first restraints, the second restraint defining a slot configured to receive an axial end of the driveshaft such that rotation of the driveshaft actuates the second restraint between a raised position and a lowered position; and
a handle coupled to the driveshaft and configured to translate the driveshaft and to actuate such that the respective drive pin is received by the notch of the respective first restraint to move the respective first restraint between the lowered position and the raised position.

15. The cargo restraint system of claim 14, wherein the drive disk includes a first drive disk having a first circumferential notch and a second drive disk having a plurality of second circumferential notches each having a smaller dimension than the first circumferential notch.

16. The cargo restraint system of claim 15, further comprising a shaft configured to be rotatably coupled to the head via at least one fastener, wherein:
each of the first drive disk and the second drive disk include a tab extending radially outward from the first drive disk and the second drive disk; and
the shaft defines a shaft notch configured to receive the tab of the first drive disk and the second drive disk to rotatably couple the first drive disk and the second drive disk to the shaft and to the head.

17. The cargo restraint system of claim 16, wherein:
the locking disk includes an axial tab configured to be received by at least one of the plurality of the second circumferential notches in response to the head being in the raised position; and
the locking disk includes a radial tab configured to be received by the shaft notch in response to the head being in the raised position.

18. The cargo restraint system of claim 17, wherein the respective drive pin is further configured to displace the axial tab out of the at least one of the plurality of the second circumferential notches in order to allow the respective first restraint to actuate from the raised position to the lowered position.

19. The cargo restraint system of claim 17, further comprising:
an end piece; and
a spring located between the end piece and the locking disk and configured to exert a force on the locking disk to cause the axial tab to remain in the at least one of the plurality of the second circumferential notches and to cause the radial tab to remain in the shaft notch in response to the head being in the raised position in order to lock the head in the raised position.

20. A cargo restraint system for use with a cargo loading system of an aircraft, the cargo restraint system comprising:
a driveshaft having a plurality of drive pins;
a plurality of first restraints each configured to actuate between a lowered position and a raised position in which each of the plurality of the first restraints restricts movement of cargo in the cargo loading system, each of the plurality of first restraints having:
a head configured to actuate between the lowered position and the raised position,
a drive disk rotatably coupled to the head and having a notch that is configured to receive a respective drive pin of the plurality of drive pins, and
a locking disk configured to be received by the drive disk in response to the head being in the raised position in order to lock a respective first restraint in the raised position;
a second restraint of a different type than the plurality of first restraints, the second restraint defining a slot configured to receive an axial end of the driveshaft such that rotation of the driveshaft actuates the second restraint between a raised position and a lowered position, and having:
a cog with at least two edges rotatably coupled to the second restraint,
an element configured to interface with the cog, and
a spring configured to exert a force on the cog towards the element to lock the second restraint in the raised position in response to the cog interfacing with the element; and
a handle coupled to the driveshaft and configured to translate the driveshaft and to actuate such that the respective drive pin is received by the notch of the respective first restraint to move the respective first restraint between the lowered position and the raised position.

* * * * *